Jan. 19, 1926. 1,570,310
L. R. LJUNGBERG ET AL
SHEET METAL DOOR AND ANALOGOUS STRUCTURE
Filed Oct. 10, 1922 2 Sheets-Sheet 1

INVENTORS.
Lawrence R. Ljungberg
and William A. Ankerberg.
by Parker & Prochnow
ATTORNEYS.

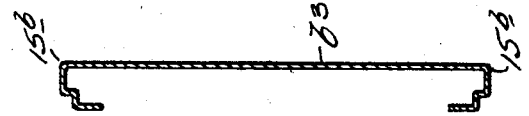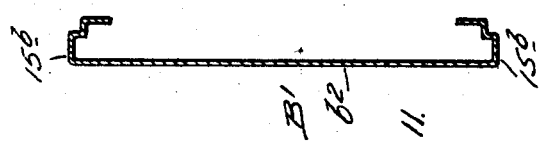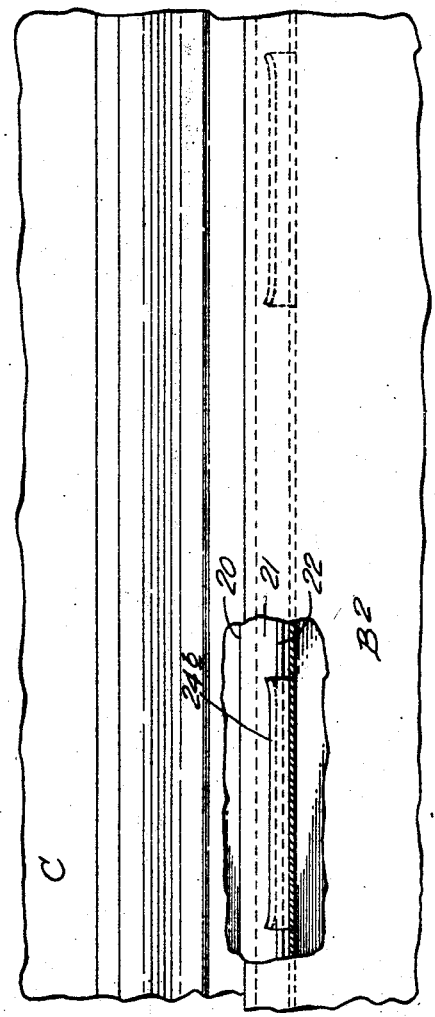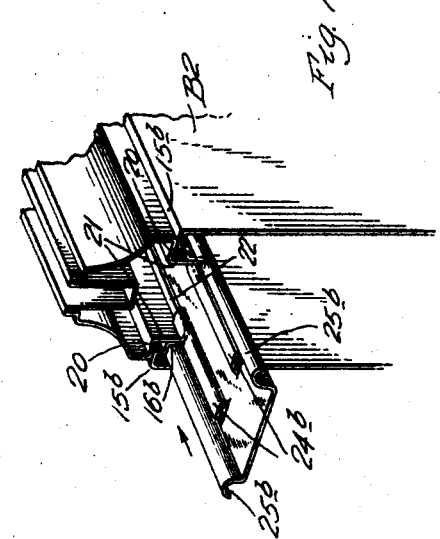

Patented Jan. 19, 1926.

1,570,310

UNITED STATES PATENT OFFICE.

LAWRENCE R. LJUNGBERG AND WILLIAM A. ANDERBERG, OF JAMESTOWN, NEW YORK, ASSIGNORS TO ART METAL CONSTRUCTION COMPANY, OF JAMESTOWN, NEW YORK.

SHEET-METAL DOOR AND ANALOGOUS STRUCTURE.

Application filed October 10, 1922. Serial No. 593,604.

*To all whom it may concern:*

Be it known that we, LAWRENCE R. LJUNGBERG and WILLIAM A. ANDERBERG, citizens of the United States, residing at Jamestown, in the county of Chautauqua and State of New York, have invented a new and useful Improvement in Sheet-Metal Doors and Analogous Structures, of which the following is a specification.

This invention relates to improvements in sheet metal doors and analogous sheet metal structures which are composed of separate, sheet metal parts or members which are secured together and retained in connection with each other by interlocking or interfitting joints formed by folded or bent sheet metal parts. For instance, in sheet metal doors, the panel mouldings are joined to the stiles and rails of the door by such interlocking or folded joints.

Joints of many different constructions have been heretofore proposed for securing together the parts of such sheet metal structures, but many of these joints are impractical from a manufacturing standpoint, or are not desirable from one or another standpoint. For example, some of the joints heretofore proposed are constructed so that in assembling the parts it is necessary for one part to be slipped endwise into connection with the other, and if the folded parts forming the joint are made in the closely interfitting relation which they are to retain, much difficulty and labor are experienced in slipping the parts together, because of the friction between the same. Furthermore, much more time and labor are required to assemble parts of this character than where the parts are made so that they can be fitted together edgewise. In order to avoid this difficulty, joints have been made in which the parts of the joint fit each other loosely when being assembled, so as to facilitate the assembling, but the parts of such joints have to be compressed into closely fitting relation after the parts are engaged, and this necessitates the use of a mandrel or special manipulation which increases the labor or inconvenience of completing the structure.

One of the objects of this invention is to produce a sheet metal door or analogous hollow sheet metal structure, the parts of which can be readily assembled and secured with the minimum of labor and expense, but of a construction which nevertheless insures strong, rigid and closely fitting joints between the parts and braces the opposite walls of the hollow structure. Other objects of the invention are to produce a sheet metal door or analogous, hollow sheet metal structure, in which the parts can be readily fitted together edgewise, and are locked together and braced so as to be held rigidly from relative movement by a key member which is inserted endwise into interlocking engagement with the interfitting portions of the parts of the structure; also to so construct the parts that the key member can be quickly and easily inserted into place, but will, nevertheless draw the parts of the structure tightly together and hold them rigidly against relative movement, and form a stiff brace for the opposite walls of the structure; and also to improve hollow, sheet metal doors in the other respects hereinafter described and set forth in the claims.

In the accompanying drawings:

Figs. 6, 7 and 8 are sections of the rail, moulding and key strip respectively of the form shown in Fig. 5.

Fig. 9 is a fragmentary elevation, partly broken away, of the construction shown in Fig. 5.

Fig. 10 is a fragmentary, sectional, perspective view thereof indicating the manner of inserting the key strip.

Fig. 11 is a cross section of an intermediate door rail which requires mouldings at its opposite edges.

Figure 2:
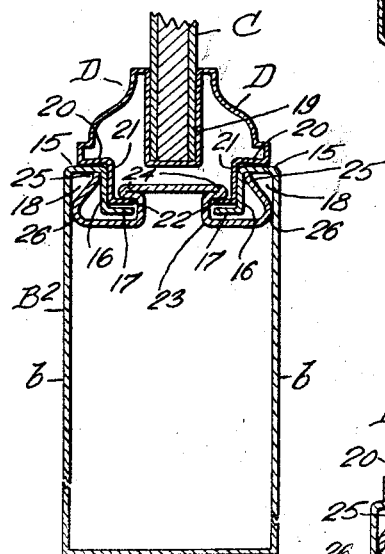
Fig. 2 is a transverse section thereof enlarged, on line 2—2, Fig. 1.

A represents the stiles, B, B' and B² the upper, intermediate and lower rails, and C the panels of a sheet metal door. D represents sheet metal mouldings or members which extend along the edges of the stiles and rails for holding the panels in place and providing ornamental, marginal mouldings for the panels. Each of the stiles A preferably consists, as usual, of a single piece of sheet metal bent into channel form, having opposite, parallel front and rear walls *a* connected by an edge wall. The upper and lower rails can each be formed in a similar manner from a single piece of sheet metal bent into channel form and having front and rear walls *b* connected by an edge wall *b'*, as shown in Fig. 2. The intermediate rail or rails are usually composed of separate, front and rear walls $b^2$ and $b^3$, (see Fig. 10), because of the use of mouldings at the opposite edges of the intermediate rail or rails. The joints for connecting the mouldings to the edges of the stiles and rails are, however, of similar formation, as will now be described.

Figure 1:
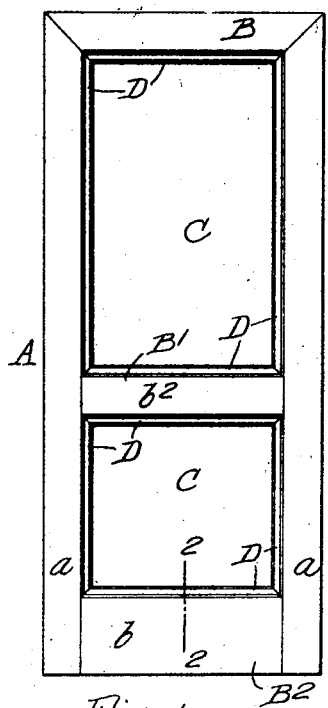
Fig. 1 is a reduced front elevation of a sheet metal door having the parts thereof connected by means embodying my invention.
Figure 5:
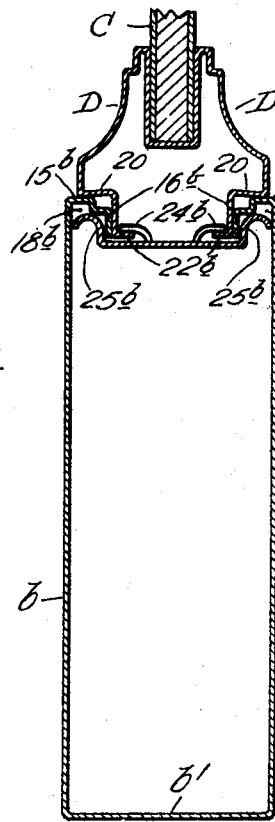
Fig. 5 is a cross section, similar to Fig. 2, showing a slightly modified embodiment of the invention.
Figure 6:
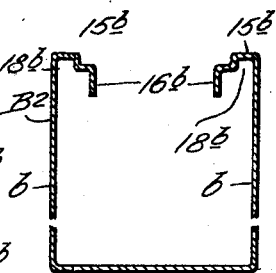
Figure 7:
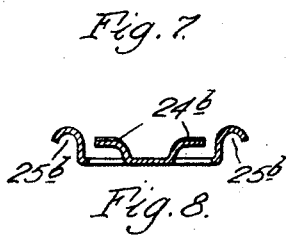
Figure 3:
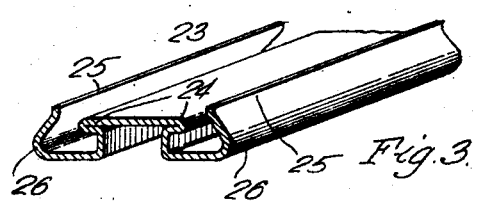
Fig. 3 is a sectional perspective view of a portion of the key strip.

The construction shown in Figs. 1–3 will be described first.

The inner edge of each of the front and rear walls *b* of the rail is bent first laterally inward at right angles to the plane of the wall, forming a shoulder 15, then inwardly, parallel with the wall *b*, as indicated at 16, and then laterally inward, forming an inwardly projecting, lateral flange 17. The shoulder portion 15 is relatively wide, forming a wide space or channel 18 between the inner face of the wall *b* and the inbent portion 16. The moulding member D is also preferably made from a single piece of sheet metal bent into suitable shape to provide any desired configuration for the exposed ornamental portion of the moulding, and a recess or seat 19 to receive the panel. The moulding, as shown in Fig. 2, has a central groove 19 to receive the panel, and the edges of the opposite walls of the moulding are bent first laterally inward at 20, then outwardly, parallel with the face of the rail as indicated at 21, and then laterally inward, forming an inwardly projecting, lateral flange 22. The parts 20, 21 and 22 are located opposite and extend in the same general direction as the corresponding parts 15, 16 and 17 respectively of the rail, but preferably the inwardly extending shoulders 20 of the moulding are formed at slightly acute angles so that they bear only at their outer edges against the shoulders 15 of the rail, thereby insuring tight joints at these edges. The moulding is also preferably made so that a slight clearance is left between each flange 22 of the moulding and the opposed flange 17 of the rail. The moulding thus formed is adapted to be seated or inserted edgewise into place in the edge of the rail with the outbent portions 21 of the moulding fitting between and against the corresponding portions 16 of the rail.

The moulding and rail are secured together in this position by a key member or strip 23 which is shaped so as to provide opposite portions which extend around the flanges 17 and 22 of the rail and moulding and extend into the channels 18 between the walls *b* and the inbent portions 16 of the rail. The key member is provided between its edges with opposite, outwardly directed flanges or portions 24 which project over and bear upon the inwardly projecting flanges 22 of the moulding, and the key strip also has opposite edge flanges 25 which extend around the flanges 17 into the channels 18 of the rail. The key member is inserted endwise into place in the rail in the position shown in Fig. 2, and when in place, the extreme edges of the side flanges 25 will engage in the inner corners of the channels 18 of the rail, and the opposite shoulder portions 26 of the key member will bear against the inner faces of the opposite walls *b* of the rail, while the inwardly extending flanges 17 and 22 of the rail and moulding will project inwardly between the body and the outwardly directed portions 24 of the key member. The key member will thus lock the moulding D in its seat in the rail against the shoulders 15 of the latter. Furthermore, the key member braces the opposite walls of the rail, preventing the collapsing of the rail or inward displacement of the walls toward each other. Nevertheless, since the side flanges 25 of the key member enter the wide channels 18 between the walls *b* and portions 16 of the rail and bear against the rail only at the shoulders 26 and at the extreme edges of the flanges 25 of the key member, the latter can be easily slipped into its interlocking relation with the rail and moulding. Inasmuch as the inwardly extending flanges 22 of the moulding are spaced slightly away from the opposing flanges 17 of the rail, the key member tends to spring or press the flanges 22 toward the opposing flanges 17 of the rail and thereby draw the moulding tightly to its seat on the rail. This construction, therefore, holds the key member firmly in place and insures that the shoulders 20 of the moulding will fit snugly at their outer edges against the shoulders 15 of the rail. Inward displacement of the moulding is prevented by the engagement of the shoulders 15 and 20, and lateral displacement is prevented by the portions 16 and 21, while the key member interlocking with the moulding and rail, prevents outward displacement of the moulding. Therefore, while the moulding and rail can be quickly and easily secured together, the described construction nevertheless results in a very strong, firm and durable connection of the parts. The broad shoulders 15 and flange 17 on the rail, supplemented by the bracing action of the inclined flanges 25 of the key member in the wide channels 18 of the rail, make the structure exceedingly stiff and rigid at the joints between its parts.

Figure 4:
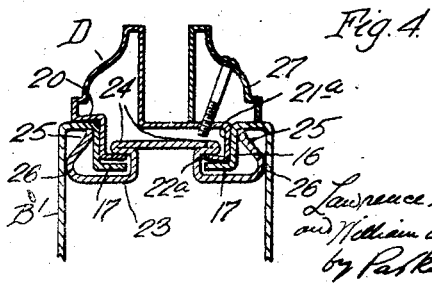
Fig. 4 is a view similar to Fig. 2, showing a moulding and stop for a detachable panel or glass.

Fig. 4 illustrates the form of connection preferably used with a moulding for a detachable panel or glass. In this form, the rail and the key member are formed as before described, and the form of the moulding is the same, except at that side thereof where the removable stop 27 for the panel is located. The moulding has no shoulder 20 at this side, but only an outbent portion 21ª and flange 22ª cooperating with the portions 16 and 17 respectively of the rail. The flange 22ª is adapted to abut against the flange 17 to prevent inward displacement of the moulding at this side, but preferably diverges inwardly away from the flange 17 so that the key member by pressure on the flange 22ª will draw the moulding to a firm seat on the rail.

Figs. 5–10 show a slightly modified form of the invention. In this construction the moulding has the shoulders 20, outbent portions 21 and lateral flanges 22, and the rail has shoulders 15ᵇ, and inbent portions 16ᵇ against which the portions 20 and 21 of the molding bear, as before described, but the rail has no inwardly projecting flanges 17. The key strip or member has opposite, outwardly directed portions 24ᵇ engaging the moulding flanges 22, but these portions 24ᵇ are formed by lugs or tongues punched out at intervals from the metal of the strip. The key strip also has side flanges 25ᵇ extending around the flanges 22ᵇ into the channels 18ᵇ of the rail, but these flanges are curved outwardly from their juncture with the body of the strip and bear at their outer edges against the walls $b$ of the rail, and at their inner angles against the edges of the inbent portions 16ᵇ of the rail. The key strip thus acts in a similar manner to draw and lock the parts together, and to brace the walls of the rail. Since the key flanges 25ᵇ embrace the edges of the inbent portions 16ᵇ of the rail, they brace these portions and prevent them from spreading so that lateral flanges thereon (such as 17), are not needed.

As shown in Fig. 11, the opposite walls of the intermediate rail are made separate, and both edges of each wall are formed for the connection of a moulding therewith, but the edge formation of the walls is the same as in the construction shown in Figs. 5–8, and the mouldings fit thereon and are secured by key strips, just as described in connection with Figs. 5–8. Manifestly, the connection disclosed in Figs. 2 and 3 is similarly applicable to rails or other parts of the structure having the opposite walls thereof separate as shown in Fig. 11.

In the above description for the sake of brevity and clearness, the invention has been explained as for the connection of a moulding to a door rail, but the same construction is used for connecting the mouldings and stiles or other parts of a door, and is equally adapted for the connection of the parts of analogous sheet metal structures. The description, therefore, should be interpreted in this way, and the terms "moulding" and "rail" be understood as embracing other analogous parts.

The stiles and rails of the door can be secured together where they join each other, and the meeting ends of the moulding can be joined together in any suitable way, as for instance by welding.

We claim as our invention:

1. The combination of parts of a sheet metal structure to be connected, one of said parts comprising opposite side walls having edge portions bent towards each other and then substantially parallel with said walls forming relatively wide internal channels, said other structure part comprising opposite walls which extend between and contact with the inside faces of the inner walls of said channels, and have inwardly extending lateral flanges, portions on said structure parts which abut to prevent inward displacement of the parts, said parts being adapted to be placed together edgewise and a key member which locks said structure parts together and extends from one to the other of said opposite walls for bracing the same, said key member having outwardly directed portions between its side edges which engage the inner faces of said lateral flanges and also having side flanges which enter said channels and extend diagonally in said channels from one to the other of the opposite walls thereof and bear against the ends of said channels, said key member acting to draw the abutting portions of said structure parts together.

2. The combination of parts of a sheet metal structure to be connected, one of said parts comprising opposite walls having bent portions connected thereto by parts extending perpendicularly therefrom and forming lateral shoulders and relatively wide internal channels at the edge of said part, said other structure part having shoulders, the outer edges of which abut against the shoulders of the first part and comprising walls which extend between and contact with the inside faces of the inner walls of said channels and have inwardly extending lateral flanges, spaced from said lateral flanges of said other part and a key member which locks said structure parts together and extends from one to the other of said opposite walls for bracing the same, said key member having outwardly directed portions which engage said lateral flanges and also having side flanges which enter said channels and extend transversely in said channels from one to the other of the opposite walls thereof, said key member acting to draw said outer edges of said second shoulders into firm contact with the faces of said first shoulders to form tight joints therewith.

3. The combination of parts of a sheet metal structure to be connected, one of said parts comprising opposite walls having bent portions forming relatively wide lateral shoulders and relatively wide internal channels at the edge of said part and inwardly extending lateral flanges, said other structure part having relatively wide shoulders which extend at an acute angle to said shoulders of the first part and the outer edges of which abut against said shoulders and having walls which extend from said shoulders and are adapted to be disposed between and contact with the inner walls of said channels and have inwardly extending lateral flanges, and a key member which locks said structure parts together and extends from one to the other of said opposite walls for bracing the same, said key member having outwardly directed portions which engage said last mentioned lateral flanges and act to draw the edge portions of said last mentioned shoulders tightly against said first mentioned shoulders, said key also having side flanges which enter said channels and extend transversely in said channels from one to the other of the opposite walls thereof.

4. The combination of parts of a sheet metal structure to be connected, one of said parts comprising opposite walls having bent portions connected thereto by parts extending perpendicularly therefrom and forming lateral shoulders and relatively wide internal channels at the edge of said part and inwardly extending lateral flanges, said other structure part having shoulders the edge portions of which abut against corresponding portions of the shoulders of the first part and comprising walls which extend between and contact with the inner walls of said channels and have inwardly extending lateral flanges which are spaced from said first mentioned lateral flanges, said parts being adapted to be placed together lengthwise and a key member which locks said structure parts together and extends from one to the other of said opposite walls for bracing the same, said key member having outwardly directed portions which engage said last mentioned lateral flanges and press the same toward said other lateral flanges and act to draw said shoulders of the last mentioned part tightly against the shoulders of said first mentioned part, said key also having side flanges which enter said channels and extend transversely in said channels from one to the other of the opposite walls thereof.

5. The combination of parts of a sheet metal structure to be connected, one of said parts comprising opposite walls having bent edge portions forming relatively wide internal channels, said other structure part comprising walls which extend between and contact with the inner walls of said channels, and have inwardly extending lateral flanges, portions on said structure parts which abut to prevent inward displacement of the parts, and a key member which locks said structure parts together and extends from one to the other of said opposite walls for bracing the same, said key member having outwardly directed portions which engage said lateral flanges to draw said parts together and also having side flanges which enter said channels at an inward inclination and bear at their edges in the inner corners of said channels and have rounded intermediate portions which bear against the outer walls of said channels and stiffen said first mentioned part to resist the pressure exerted on said abutting parts by said key member.

6. The combination of parts of a sheet metal structure to be connected, one of said parts comprising opposite walls having bent portions forming lateral shoulders and relatively wide internal channels at the edge of said part, said other structure part having shoulders which abut against the shoulders of the first part and having walls which extend from said shoulders and are adapted to be disposed between and contact with the inner walls of said channels and have inwardly extending lateral flanges, said parts being adapted to be placed together edgewise and a key member which locks said structure parts together and extends from one to the other of said opposite walls for bracing the same, said key member having outwardly directed portions which engage said lateral flanges to draw said shoulders into firm contact and also having side flanges which enter said channels at an inward inclination and bear at their edges in the inner corners of said channels and have intermediate parts which engage the outer walls of said channels at a distance from the bottoms of said channels.

LAWRENCE R. LJUNGBERG.
WILLIAM A. ANDERBERG.

Certificate of Correction.

It is hereby certified that in Letters Patent No. 1,570,310, granted January 19, 1926, upon the application of Lawrence R. Ljungberg and William A. Anderberg, of Jamestown, New York, for an improvement in " Sheet-Metal Doors and Analogous Structures," an error appears in the printed specification requiring correction as follows: Page 4, lines 49 and 50, claim 4, for the word "lengthwise" read *edgewise;* and that the said Letters Patent should be read with this correction therein that the same may conform to the record of the case in the Patent Office.

Signed and sealed this 9th day of March, A. D. 1926.

[SEAL.]

M. J. MOORE,
*Acting Commissioner of Patents.*